United States Patent

[11] 3,563,138

[72] Inventors James A. Symonds
 Penfield;
 John J. Callahan, Chili, N.Y.
[21] Appl. No. 835,400
[22] Filed June 23, 1969
[45] Patented Feb. 16, 1971
[73] Assignee Sybron Corporation
 Rochester, N.Y.

[54] DIFFERENTIAL PRESSURE RESPONSIVE DEVICE WITH DIAPHRAGM EQUALIZATION
 11 Claims, 10 Drawing Figs.
[52] U.S. Cl. .................................................. 92/48,
 92/49, 92/97; 73/393, 73/407
[51] Int. Cl. .................................................. F01b 5/06
[50] Field of Search .................................... 92/97, 48,
 49; 73/407, 393, (Inquired)

[56] References Cited
UNITED STATES PATENTS
1,678,700 7/1928 McEwan ..................... 92/97X

| | | | |
|---|---|---|---|
| 2,381,427 | 8/1945 | Bell et al. ..................... | 92/97X |
| 2,627,750 | 2/1953 | Titus ........................... | 73/407 |
| 2,679,209 | 5/1954 | Fischer et al. ................ | 92/48X |
| 2,680,375 | 6/1954 | Schaus ......................... | 92/48X |

*Primary Examiner*—Martin P. Schwadron
*Assistant Examiner*—Leslie J. Payne
*Attorneys*—Peter J. Young, Jr. and Joseph C. MacKenzie ABSTRACT: A pair of nominally identical diaphragms are rigidly interconnected with the end of a bar to deflect same. A connector on the end of the bar has an oblique circumferential track. Stems on the diaphragms are clamped in the track. To adjust for diaphragm differences, the stems are unclamped and the connector is rotated to shift the stems, the one stem moving toward the axis of bar deflection, and the other moving away therefrom. In this way, the difference between the diaphragms' responses to pressure is neutralized by difference in effective lever arm of said diaphragms on said bar. The connector may be in the form of two like cylinders, each having nonparallel bases and clamping the stems between them.

PATENTED FEB 16 1971
3,563,138
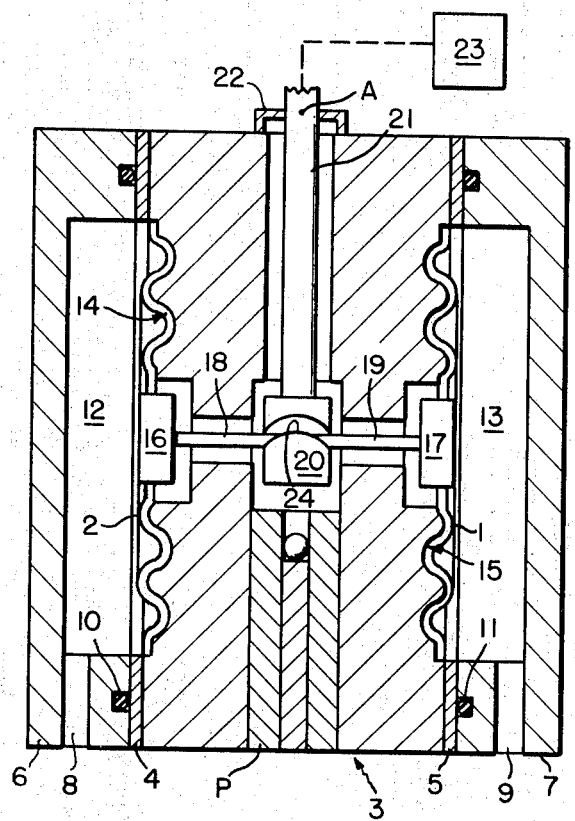
INVENTORS
JOHN J. CALLAHAN
JAMES A. SYMONDS
BY
ATTORNEY

DIFFERENTIAL PRESSURE RESPONSIVE DEVICE WITH DIAPHRAGM EQUALIZATION

CROSS REFERENCE TO RELATED APPLICATIONS

Beach et al. filed Jun. 23, 1969 Ser. No. 835,566, entitled DIFFERENTIAL PRESSURE RESPONSIVE DEVICE OF WELDED CONSTRUCTION, and assigned to the assignee of the present application.

BACKGROUND OF THE INVENTION: FIELD OF THE INVENTION

The background of the invention is mechanism as applied to a fluid pressure responsive device of the kind having a pair of diaphragms or the like for detecting the difference between two fluid pressures. The diaphragms convert the respective pressures to forces. Mechanism interconnecting the diaphragms opposes the one force to the other to produce a net movement of the mechanism proportional to the difference between said pressures. The space between the diaphragms is solidly filled with liquid, so if the diaphragms differ in effective area, the said net movement will also reflect the temperature of said liquid. Thus, if the temperature of the liquid changes, its volume changes also. This volume change changes the pressure in the liquid, whereby the said net movement reflects the change in liquid pressure.

BACKGROUND OF THE INVENTION: DESCRIPTION OF THE PRIOR ART

In the prior art, identity of diaphragms has been sought in various ways: close control of diaphragm manufacture, selection and matching from mass produced diaphragms, providing diaphragm mountings and fittings which trim the diaphragms' effective area, and providing means in the mechanism operated by the diaphragm to neutralize lack of identity.

SUMMARY OF THE INVENTION

The present invention takes the last approach. In the present invention, a pair of nominally identical diaphragms are rigidly interconnected to the end of a bar to deflect same. A connector on the end of the lever has an oblique circumferential track. Stems on the diaphragms are clamped in the track. To adjust for diaphragm differences, the stems are unclamped and the connector is rotated to shift the stems, the one stem moving toward the axis of bar deflection, and the other moving away therefrom. In this way, the difference between the diaphragms' responses to pressure is neutralized by difference in their effective lever arms on said bar. The connector may be in the form of two like cylinders each having nonparallel bases to define the track, and clamping the stems between them.

BRIEF DESCRIPTION OF THE DRAWINGS

FIG. 1 is a mainly sectional view of a differential pressure responsive device incorporating the present invention.

FIGS. 2 and 3 are enlarged elevations of a diaphragm stem connector shown in FIG. 1.

FIGS. 4 through 8 are scale views, about four times life size, of a constructional form of the diaphragm stem connector of FIGS. 1, 2 and 3.

FIGS. 9 and 10 are alternate forms of the stem connector.

DESCRIPTION OF THE PREFERRED EMBODIMENT OF THE INVENTION

In FIG. 1, reference numerals 1, 2 and 3 respectively identify two diaphragms and a body supporting said diaphragms. Reference numerals 4 through 7 respectively identify two welding rings and two flanges. Reference numerals 8 through 11 respectively identify two ports for pressure admission and two gaskets for sealing the flanges to the diaphragm peripheries.

Diaphragms 1 and 2, rings 4 and 5, and gaskets 10 and 11 are preferably circular, so the showing of FIG. is a diametral section normal to the general planes of diaphragms, rings and gaskets. Body 3 and flanges 6 and 7, may be more or less square in external contour when viewed from a direction normal to the diaphragms, but, of course, the surfaces thereof next the welding rings and diaphragm peripheries have a circular configuration relieved, in flanges 6 and 7, by pressure spaces 12 and 13 and on body 3 by undulations 14 and 15 substantially which, as shown, are of the usual corrugated type.

Ordinarily, the diaphragms, body and flanges will be made of metal. The choice of metal may be made in view of the material that will come in contact with the parts. In addition, the metal of the diaphragms will be chosen with an eye to its elastic properties.

The center portions of the diaphragms have pads 16 and 17 fixed thereto, and from the pads extend stems 18 and 19 to a connector 20 to which the stems fasten. For the moment, pads, stems and connector may be considered a single rigid member interconnecting the centers of the diaphragms to a rigid bar 21. Bar 21 is pivoted at 22 to the body 3 for deflection about an axis normal to the paper at point A for deflection in the plane of the drawing and more or less normal to the diaphragms.

As FIG. 1 suggests, body 3 is suitably bored out in its interior to accommodate the parts within it, and to permit some motion thereof. Customarily, the space within the body is solidly filled with liquid, and sealed at 22 to retain such liquid. In use, the device of FIG. 1 is used to sense the difference between a first fluid pressure admitted to space 12 via port 8, and a second fluid pressure admitted to space 13 via port 9. The flanges, of course, confine such pressures so that they act on the diaphragms, creating forces on the beam 21 the essential measure of which is the effective areas of the diaphragms.

The force due to pressure on diaphragm 1 opposes that due to pressure on diaphragm 2, so that net force is proportional to the difference between the magnitudes of the pressures. The effect of this net force depends on the resistance to it offered by diaphragms 1 and 2, and bar 21. Diaphragms 1 and 2 resist the net force in accordance with their spring constants, the means sealing and pivoting bar 21 at 22 may provide some resistance to deflection of bar 21, a spring and/or force-balancing mechanism may resist the net force, and so on. In any given case, for a given net force on it, bar 21 will deflect a given amount. Such deflection is the output of the device of Fiig. 1, and has to be sensed or detected in order to put it to use. Many suitable instrumentalities for sensing such motion are well known, e.g., switches, baffle-nozzle devices, and the like. Hence, box 23 represents a motion detector for sensing deflection of bar 21.

In operation, diaphragms 1 and 2 move as a unit due to the liquid fill, and it is desired that such movement be only due to the pressures in spaces 12 and 13. The liquid fill, however, has a static pressure acting against the diaphragms and the bar 21. Normally, it is the practice to pivot and seal bar 21 to body 3 at 22 so as to keep this static pressure from forcing the bar outwardly of the body 3. However, if the liquid's static pressure changes relative to the pressure in spaces 12 and 13, say due to thermal expansion or contraction of the liquid, and the diaphragms are not identical, there will be a net moment change on the bar 21 solely due to the static pressure change, and in a measure that reflects the difference between the diaphragms and the static pressure change. As a rule, the static pressure change will be due to thermally caused volume change in the liquid in the body. Thus, if the temperature of the liquid increases, its volume increases. While the diaphragms, which are commonly quite flexible, will bulge a little to make room for the increased volume, each diaphragm in so doing will change its moment on bar 21 by an amount proportional to its effective area and spring constant. In practice, some attempt is made to manufacture and select diaphragm pairs such that the net moment change is as nearly zero as possible.

However, the approximation to identify practically obtainable in this fashion is less than desirable, so other expedients are resorted to in order to obtain a functional identity between diaphragms 1 and 2. In the present invention, this functional identity is attained by balancing the effective lever arms of the diaphragms, namely, the lever arms provided by bar 21. Thus, connector 20 is made in the form of a right-cylindrical cam having an oblique track 24.

FIGS. 2 and 3 show the nature of the cam arrangement. In FIG. 2, suppose that diaphragms 1 and 2 are in fact identical, and the view is an elevation looking along the stem 18 toward diaphragm 1. Taking stem 18 as a right circular cylinder, its cylinder axis will bisect the cylinder axis of connector 20. Further, taking stem 19 as identical to stem 18, the cylinder axis of both stems would fall on the same straight line. Accordingly, if bar 21 were also a right cylinder and the stem axes intersect its cylinder axis, then the effective lever arms of diaphragms 1 and 2 on bar 21 would be identical. Therefore, with identical diaphragms, no pressures on the diaphragms could cause bar 21 to deflect, except if the pressure on the one diaphragm differed from the pressure on the other diaphragm.

Obviously, this ideal situation usually cannot develop merely by control of manufacturing tolerances, etc. The cam 20, however, provides a means for neutralizing the effect of nonideality. While this nonideality can be ascribed to various influences, adjustment of effective lever arms of the diaphragms can neutralize the effect of the sum total of those influences. Supposing connector 20 to be a rigid cylindrical body composed of beveled portions 25 and 26, interconnected by reduced portion 27, and that the connector is mounted on the end of bar 21 for rotation on the cylinder axis of connector 20, then rotation of the connector will change the lever arms of diaphragms 1 and 2 by shifting stems in opposite directions from point A. For example, in FIG. 3, the viewing direction is as in FIG. 1, but the connector 20 has been rotated 90° on its cylinder axis. Consequently, the effect point of connection of stem 18 to bar 21 has moved away from the axis at point A, whereas the effective point of connection of stem 19 to bar 21 has moved toward the axis at point A. The lever arms of the diaphragms 1 and 2 are therefore different, and the sense of the difference is such as would be necessary to compensate for diaphragm 1 having a lesser spring constant and/or a greater effective area than diaphragm 2. If the connector 20 were rotated 180° from the position shown in FIG. 3, then the sense of lever arm change would be such as is necessary to compensate for lesser spring constant and/or greater effective area in diaphragm 2.

The lever arm differentials described in connection with FIG. 3 are, of course, maxima. Ordinarily, the obliqueness of the track 24 would be chosen so that such compensation for diaphragm inequality as may be needed would fall in between the maxima. That is, the diaphragm manufacturing process can be controlled so that deviation from identity, of the diaphragms thus manufactured, will normally fall within a predetermined tolerance. This tolerance would essentially determine the range of effective lever arm adjustment to be provided.

Clearances between body 3 and the diaphragms is rather smaller than indicated (in order to minimize the total volume of liquid inside the body), and the diaphragms are supposed to mate relatively precisely against the adjacent by surfaces when the pressure differential across the diaphragm unit exceeds a certain value. Accordingly, the diaphragms should not distort appreciably in response to rotating connector 20.

It is, of course, necessary to clamp connector 20 to bar 21 in the position to which the connector is rotated. Also, the stems 18 and 19 must then be clamped in the track 24. Accordingly, we provide connector 20 in the particular form shown in FIGS. 4 through 8.

As will be seen from FIG. 4, 5 and 6, elements 25 and 26 are annuli, and are coaxially mounted on a split sleeve 28 fixed to the end of bar 21. The sleeve is externally threaded as indicated at 29, FIGS. 5 and 6 internally threaded as indicated at 30 (FIG. 5, but not FIG. 6, since showing of the threading would confuse the view), and the annuli 25 and 26 mount freely but accurately on sleeve 28. The sleeve is split as indicated at 31 to provide a slot about the width of stems 18 and 19, which, as shown in FIG. 4, extend to the center of the sleeve interior, until, as shown in FIG. 5, a set screw 32 is screwed into the interior of the sleeve to bend the ends of the stems 18 and 19 against the interior of annulus 25.

The annuli 25 and 26, with stems 18 and 19 therebetween, are drawn up to the end of bar 21 by means of a sleeve nut 33, which therefore provides means for clamping the stems in the track 26 formed by the space between the annuli 25 and 26.

The rotary position of the annuli is adjusted with the annuli drawn up not quite tightly against the end of bar 21, and prior to emplacing screw 32 in sleeve 28. To provide for such adjustment, annulus 26 has a flange 34, slotted at 35, to allow a hollow-ended tool to slip over sleeve nut 33, engage the slots 35, and turn the annulus 26.

A pin 36 fixed to annulus 25 fits slidably in a bore of annulus 26, so that annulus 25 is entrained by annulus 26, when the latter rotates. Pin and bore are located so that the facing, oblique sides of annuli 25 and 26 are parallel.

The rotary position of the connector 20 is determined by testing the effect of changing static pressure inside body 3. Thus, means (not shown) would connect a source of adjustable test pressure to the space between the diaphragms. Test pressure would then be varied over some suitable range of values. The correct angular position of connector 20 would be that in which such angular deflection of bar 21 as occurred would be below some predetermined value, ideally, but not actually, zero, and remain so over the range of adjustment of the test pressure. The pressures in spaces 12 and 13 should not vary during the test.

The test is conducted prior to filling body 3 with liquid, and the test pressure may be positive or negative with respect to the pressure in spaces 12 and 13. In the absence of liquid in the body 3, the test pressure may instead be applied to spaces 12 and 13, simultaneously.

Once such position of connector 20 is found, sleeve nut 33 is turned to draw the annuli 25 and 26 tightly enough to clamp the annuli and the stems 18 and 19 in place. Then set screw 32 would be screwed into sleeve 28 to bend the ends of stems 18 and 19 over as shown in FIG. 5. The showing in FIGS. 4, 5 and 6 implies actual identity of diaphragms 1 and 2, not likely to exist in practice, but best suited for showing in the drawing.

In the state shown, sleeve nut 33 would be in place in FIG. 5, but has been omitted therefrom for clarity of illustration. Nut 33, it will be observed, has slots 38 in its flanged lower end to provide for driving it with a screwdriver. The adjustment of connector 20 will be carried out with the differential pressure responsive device completed to the extent indicated in FIG. 1, but with the filler plug P absent, so that access to the connector, with suitable tools, is possible. Once the screw 32 has been set in place, the space within body B is filled with liquid and the plug P is applied, as more particularly described in the above-mentioned copending application.

FIGS. 7 and 8 show the annuli 25 and 26 of FIGS. 4, 5 and 6 developed on the flat, unrolled, so to speak, and laid out flush to a flat surface. Referring back to FIGS. 1, 2 and 3 (and 10), it will be seen that in these earlier FIGS. carrying at the construction with strictly parallel planar oblique faces of the elements of the connector 20 is not too convenient. For example, relatively small portions only of stems 18 and 19 are available for clamping and the ends of stems 18 and 19 would have to be bent by the element faces or would have to be bent before insertion in the track 24. The construction of FIGS. 4, 5 and 6 avoids these difficulties. Thus, the opposing faces of track 24 are parallel to each other in every plane section containing the cylinder axis of the connector. This is partially evident in FIGS. 5 and 6, and more completely evident in FIGS. 7 and 8. That is to say, if one rotated the view of FIG. 7, 180° about an axis in the plane of the view, the outlines of the elements would remain unchanged except for the rabbiting which creates flange 34. Or, to put it another way, the opposed faces of elements 25 and 26 have line contact with the cylindrical surfaces of the sections of stems 18 and 19 between said faces.

It is to be noted that there are a number of other ways of forming connector 20. As shown, the track 24 is a groove, and stems 18 and 19 are followers engaged in said groove. Obviously, the groove could be replaced by a like-shaped ridge 24A, and stems 18 and 19 could be formed as forks 18A and 19A clasping the ridge to follow same; see FIG. 9.

Again, observe that as shown in FIG. 2 that the connector 20 is two circular cylinders each having one circular base and one oblique base. Accordingly, the track could be formed by two right cylinders having their bases parallel; see FIG. 10.

It is also obvious that the upper and lower ends of the connector 20 need be neither flat nor parallel. Again, the locus of track 24 is in effect an elliptical plane section of the right circular cylinder formed by the connector, but obviously the adjacent surfaces of elements 25 and 26 need not be planar, i.e., the rate of rise of these surfaces with respect to the cylinder base could be variable, instead of constant as in the illustrated forms of the invention.

None of the above variations would affect the function of connector 20 as long as it is mounted in such orientation that rotation would shift one of stems 18 and 19 toward point A and the other thereof away from point A. However, for clarity in claiming, applicants have defined the connector as a "right cylinder" and the locus of track 24 as an "elliptical section" of the cylinder. This is highly desirable and fitting since generic language capable of literally covering the variations referred to supra would make for excessively abstract and prolix claims. Therefore, the quoted phraseology is not to be restricted solely to its literal meaning, that is to say, to the extent prior art permits, the scope of its meaning should be construed to encompass the above-described variations.

We claim:

1. In a differential pressure responsive device comprising a first fluid pressure-deflectible wall having a first effective area, a second fluid pressure-deflectible wall having a second effective area, said first wall being mounted for deflection of its effective area in response to a first fluid pressure applied thereto, said second wall being mounted for deflection of its effective area in response to a second fluid pressure applied thereto, and both walls having mechanism interconnecting said walls for producing motion in proportion to the difference between said pressures, said mechanism including a bar angularly deflectibly pivoted at one portion thereof, and having a connector fixed to another portion thereof and to said effective areas for translating deflection of said walls into angular deflection of said bar, the improvement wherein said connector is a right circular cylinder having a track around the circumference thereof, the locus of said track being an elliptical cross section of said cylinder, a first follower interengaging said track and said first effective area, a second follower interengaging said track and said second effective area, the place at which said first follower engages said track being spaced around the circumference from the place at which said second follower engages said track; said cylinder having its cylinder axis lying along the length of said bar between the said portions thereof and said walls being oriented so that their deflections are normal to said cylinder axis.

2. The invention of claim 1, wherein said followers are flexible, thrust-transmitting stems, each having one end fixed to the corresponding said wall, and its other end to said track.

3. The invention of claim 1, wherein said track is a groove, and each said follower is a stem means having one end fixed in said groove.

4. The invention of claim 1, wherein said track is a groove, and said cylinder includes a first element having one circular base and one elliptical base, and a like second element, and there being means interconnecting said first and second elements with their elliptical bases juxtaposed, substantially parallel to each other, and spaced from each other to define said track.

5. the invention of claim 1, wherein said cylinder is an annular member, said track being a slot through said member.

6. The invention of claim 5, wherein said annular member includes two annular elements, each having a circular base and an elliptical base, there being means interconnecting said two elements with their elliptical bases juxtaposed, substantially parallel to each other, and spaced from each other to define said slot.

7. The invention of claim 1, wherein said cylinder is a pair of annular elements having the end of said bar extending therethrough, said followers extending between said elements, and being clamped therebetween, and also spacing said elements one from another to define said track.

8. The invention of claim 7, wherein said end of said bar is a sleeve having a diametral slot extending through said elements, and said followers each extending into said slot.

9. The invention of claim 8, wherein said followers are stems having their ends in said slot, and bent over against the inside of one of said annular elements, and there being means in said sleeve clamping said ends of said stems against said inside.

10. The invention of claim 1, wherein said followers are cylindrical stems extending into said track, said track being defined by opposing surfaces on said cylinder, said surfaces being line tangent to the cylindrical surfaces of said stems.

11. The invention of claim 10, wherein said cylinder is in two relatively movable elements, each having a surface facing a surface of the other, the last two said surfaces being the aforesaid opposing surfaces, and there being means clamping said relatively movable elements together so as to clamp said stems therebetween.